UNITED STATES PATENT OFFICE 2,489,917

PROCESS FOR THE PRODUCTION OF FLUOROPHOSPHONIC ACID COMPOUNDS

Hamilton McCombie and Bernard Charles Saunders, University of Cambridge, Norman Bellamy Chapman, Southampton, and Robert Heap, Cheam, England No Drawing. Application February 25, 1948, Serial No. 10,938. In Great Britain April 17, 1944

Section 1, Public Law 690, August 8, 1946
Patent expires April 17, 1964

5 Claims. (Cl. 260—461)

This invention relates to the production of fluorophosphonic acid compounds and more particularly to the production of esters of fluorophosphonic acid and of bis-(amino)-phosphoryl fluorides (also called bis-amino-fluorophosphine oxides).

Esters of fluorophosphonic acid may be prepared by the process described in the specification of co-pending application Serial No. 9,964, filed February 20, 1948, but it is an object of the present invention to permit the ready preparation of a wider variety of such compounds than is possible by the process described in the aforesaid co-pending application.

The bis-(amino)-phosphoryl fluorides have on the other hand only been obtained hitherto by devious and wasteful methods.

The present invention provides a process for the production of fluorophosphonic acid compounds which comprises reacting a compound of the general formula HX, where X denotes —OR, —SR, —NHR or —NRR' and R and R' are similar or dissimilar aliphatic, aromatic or hydroaromatic radicals, which phosphorus oxydichlorofluoride in accordance with the general equation:

$$2HX + POCl_2F = X_2POF + 2HCl$$

The formation of esters therefore proceeds in accordance with the equation:

$$POCl_2F + 2ROH = (RO)_2POF + 2HCl$$

whilst bis-(amino)-phosphoryl fluorides are formed in accordance with the equation:

$$POCl_2F + 4RNH_2 = (RNH)_2POF + 2RNH_2.HCl$$

The process for the production of fluorophosphonic esters may be carried out with or without a solvent, and the use of an organic base to take up the hydrogen chloride formed during the reaction is also optional.

In the production of the bis-(amino)-phosphoryl fluorides excess of the base is required to combine with the hydrogen chloride released. The reaction is also usually carried out in the presence of a solvent. After removal first of the amine hydrochloride and then of the solvent, the bis-(amino)-phosphoryl fluoride is obtained by distillation if volatile or by recrystallisation if non-volatile.

In the preparation of some compounds, it may be advisable to pass dry ammonia through the reaction mixture in order to remove hydrogen chloride.

The compounds of the present invention are in general of a highly toxic nature. Some of these toxic compounds are useful as insecticides, fungicides, bactericides and disinfectants, and some are capable of general clinical application.

The following examples illustrate the nature of the invention:

EXAMPLE 1

*Diethyl fluorophosphonate (di-ethoxy-phosphoryl fluoride)*

The equation for the reaction is:

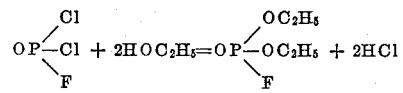

Phosphorus oxydichlorofluoride (B. P. 55°–56° C., 1 mol.) is placed in a Claisen flask fitted with a CaCl₂ tube and a small fractionating column. Ethyl alcohol (2 mols.,+10% excess) is then very slowly run in, the temperature not being allowed to rise unduly. The hydrogen chloride is removed by suction at room temperature and the residue carefully heated to remove alcohol (and HCl) and then distilled under reduced pressure. B. P. 70°–72° C. at 18 mm. Yield, 93% theory. The compound obtained contains fluorine and traces of chloride. A second distillation at 70°–72° C./18 mm. gives a product completely free from chloride. It is characterised by its B. P. of 171° C. at ordinary pressure, by its miotic action and by its fluorine analysis. One molecule requires two molecules of N/2 NaOH for hydrolysis.

EXAMPLE 2

*Diethyl dithiofluorophosphonate*

The equation for the reaction is:

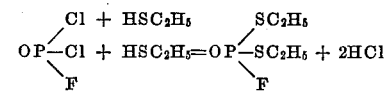

Dimethylaniline (2 mols.) and ethyl mercaptan (2 mols.) are mixed and POCl₂F (1 mol.) added in small quantities (ca. 5 g.) at a time. The reaction is carried out at room temperature, and any rise in temperature checked by cooling in cold water. The mixture is allowed to stand for some time and on adding a crystal of dimethylaniline hydrochloride the product becomes almost solid. Dry ether is then added and dimethylaniline hydrochloride filtered off. The filtrate is dried over sodium sulphate, the ether distilled off, and the residue fractionated at 15 mm. The fraction of B. P. 104°–107° C./15 mm. is collected. Found: F, 10.03%; 9.7%; OP(SC₂H₅)₂F requires F, 10.1%.

EXAMPLE 3

*Bis-(dimethylamino)-phosphoryl fluoride*

The equation for the reaction is:
$$4(CH_3)_2NH + POCl_2F =$$
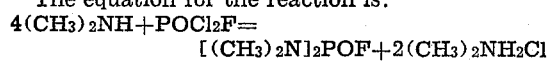

Phosphorus oxydichlorofluoride (1 mol.) dissolved in dry ether is added slowly to a solution of anhydrous dimethylamine (4 mols.) also in dry ether. A vigorous reaction takes place and dimethylamine hydrochloride is precipitated. The hydrochloride is filtered off and the ethereal solution dried over sodium sulphate, filtered, the ether distilled off and the residue fractionated. Practically the whole of it distils at 86° C./15 mm. and contains fluorine, but is found to be chlorine-free. Found: N, 17.5%. [(CH$_3$)$_2$N]$_2$POF requires N, 18.1%.

EXAMPLE 4

Bis-(benzylamino)-phosphoryl fluoride

A solution of phosphorus oxydichlorofluoride (1 mol.) in dry ether (50 cc.) is run slowly into a solution of benzylamine (4 mols.) in dry ether, keeping the reaction mixture cool meanwhile, by immersing the flask in ice-water. After all the oxydichlorofluoride has been added, the mixture is filtered and the solid washed with dry ether. (The ethereal filtrate and washings on evaporation leave no residue, showing the aminophosphoryl fluoride to be insoluble in ether.)

The solid, which is insoluble in ether, is extracted with warm water (40° C.) and filtered. The aqueous filtrate contains benzylamine hydrochloride. The insoluble residue is recrystallised from 90% aqueous alcohol. Yield of pure compound = 60%. M. P. 96° C. Found to contain fluorine and to be chlorine-free. Found: N, 10.4%. (C$_6$H$_5$CH$_2$NH)$_2$POF requires N, 10.08%.

EXAMPLE 5

Bis-(cyclohexylamino)-phosphoryl fluoride

Phosphorus oxydichlorofluoride (1 mol.) dissolved in dry benzene is added slowly (cooling in ice) to cyclohexylamine (4 mols.+4% excess) also dissolved in dry benzene. After standing for some time the precipitation of the hydrochloride is complete. The mixture is then heated to boiling and filtered hot. On cooling the benzene filtrate, colourless crystals of the cyclohexylamino compound separate. Yield, 95%. Can be obtained in a very satisfactory crystalline condition by recrystallising from aqueous alcohol at about 50° C. M. P. 127° C. Found: C, 55.20%; H, 9.37%; N, 10.9%; F, 7.76%. (C$_6$H$_{11}$NH)$_2$POF requires: C, 54.96%; H, 9.16%; N, 10.68%; F, 7.25%.

EXAMPLE 6

Di-isopropyl fluorophosphonate

Phosphorus oxydichlorofluoride (50 g.) is dissolved in dry ether (100 c. c.) and isopropyl alcohol (dried over calcium oxide; 50 g., 15% excess) in dry ether (100 c. c.) is added slowly with cooling, and the mixture allowed to stand for one hour. Dry ammonia is then passed through the liquid with cooling. The liquid is then filtered, if necessary, and the excess of ammonia and ether taken off at room temperature. The residue is distilled and the fraction B. P. 37°-47° C./0.5 mm. collected. This is redistilled at 84°-85° C./25 mm. Yield: 60 g. (90%). (Found: F, 10.1%. Calc. for C$_6$H$_{14}$O$_3$FP: F, 10.32%.)

EXAMPLE 7

Dicyclohexyl fluorophosphonate

Phosphorus oxydichlorofluoride (68.5 g., 0.5 mol.) is dissolved in dry ether (150 c. c.) and well cooled in ice-salt. Cyclohexanol (100 g., 1.0 mol.) in dry ether (150 c. c.) is slowly dropped in and the mixture allowed to stand overnight. In order to remove hydrogen chloride, dry air (dried with H$_2$SO$_4$, NaOH and P$_2$O$_5$) is pulled through the resultant liquid for about 5 hours. More dry ether is then added and dry ammonia passed through the liquid until no more ammonium chloride is precipitated. The ammonium chloride is filtered off, and the filtrate allowed to stand over lead carbonate for some considerable time, filtered and the filtrate dried with sodium sulphate. After distilling off the ether, the residue is distilled in a "semi-molecular" still, without air-leak, glass wool being employed to prevent splashing. The fraction B. P. 90°-96° C./0.02 mm. is collected. The liquid can also be distilled at slightly higher pressures in an atmosphere of nitrogen. After the "initial" distillation the above precautions are usually not necessary for further distillations. Yield, 126 g. (70%). A colourless, mobile liquid, insoluble in water. (Found: F, 7.3%; 6.9%. C$_{12}$H$_{22}$O$_3$FP requires: F, 7.12%.)

We claim:

1. A process for the production of fluorophosphonic acid compounds which comprises reacting a compound selected from the group consisting of HOR, HSR, NH$_2$R and HNRR' where R and R' are both selected from the group consisting of aliphatic, aromatic and hydroaromatic hydrocarbon radicals, with phosphorus oxydichlorofluoride.

2. A process for the production of fluorophosphonic acid compounds which comprises reacting a compound selected from the group consisting of HOR, HSR, NH$_2$R and HNRR' where R and R' are both selected from the group consisting of aliphatic, aromatic and hydroaromatic hydrocarbon radicals, with phosphorus oxydichlorofluoride and passing dry ammonia through the reaction mixture to remove the hydrogen chloride formed.

3. A process for the production of fluorophosphonic acid compounds which comprises reacting ethyl alcohol with phosphorus oxydichlorofluoride.

4. A process for the production of fluorophosphonic acid compounds which comprises reacting ethyl mercaptan with phosphorus oxydichlorofluoride.

5. A process for the production of fluorophosphonic acid compounds which comprises reacting dimethylamine with phosphorus oxydichlorofluoride.

HAMILTON McCOMBIE.
BERNARD CHARLES SAUNDERS.
NORMAN BELLAMY CHAPMAN.
ROBERT HEAP.

REFERENCES CITED

The following references are of record in the file of this patent:

UNITED STATES PATENTS

| Number | Name | Date |
|---|---|---|
| 2,409,039 | Hardy et al. | Oct. 8, 1946 |

OTHER REFERENCES

McCombie and Saunders, "Nature," vol. 157 (March 9, 1946), pgs. 287 to 289.

Lange et al., "Ber. Deutsch Chem. Ges.," vol. 65 (1932), pgs. 1598 to 1601.

H. Martin et al., "Developments in Methods and Materials for the Control of Plant Pests and Diseases in Germany," B. I. O. S. Final Report No. 1095, item No. 22, dated May–June 1946, pgs. 45–46.